United States Patent [19]

Baumberg

[11] Patent Number: 4,573,877
[45] Date of Patent: Mar. 4, 1986

[54] APPARATUS FOR ELEVATING LIQUIDS INCLUDING A PAIR OF VENTURI PIPES HAVING WIND AS MOTIVE FLUID

[75] Inventor: Iosif Baumberg, Brooklyn, N.Y.

[73] Assignee: Danmin Software and Technology Inc., Fair Lawn, N.J.

[21] Appl. No.: 700,960

[22] Filed: Feb. 12, 1985

[51] Int. Cl.⁴ ............... F04B 23/04; F04F 5/00
[52] U.S. Cl. .................. 417/76; 417/151; 417/163; 417/198
[58] Field of Search ......... 417/54, 76, 84, 87, 417/89, 151, 163, 167, 181, 196, 198, 503

[56] References Cited

U.S. PATENT DOCUMENTS

| 368,691 | 8/1887 | See ............................ 417/87 |
| 1,154,745 | 9/1915 | Browne ..................... 417/76 X |
| 1,662,101 | 3/1928 | Bossi .......................... 471/198 X |
| 1,958,354 | 5/1934 | Stephens .................. 417/198 X |
| 2,120,858 | 6/1938 | Davant ...................... 417/151 |
| 2,479,783 | 8/1949 | Sawyer et al. ............ 417/151 X |

FOREIGN PATENT DOCUMENTS

| 864203 | 1/1953 | Fed. Rep. of Germany ...... 417/151 |
| 531696 | 1/1941 | United Kingdom ............... 417/503 |
| 2097485 | 11/1982 | United Kingdom ............... 417/503 |

Primary Examiner—William L. Freeh
Assistant Examiner—Paul F. Neils
Attorney, Agent, or Firm—Ilya Zborovsky

[57] ABSTRACT

An arrangement for elevating liquids with the aid of wind has an upper delivery pipe with an upper end connected to a pumping-out device, a lower supply pipe introducable into a water source and having an upper end connected with a constriction of a Venturi pipe, and a downwardly convex pipe connecting an outlet diffuser of the Venturi pipe with the lower end of the delivery pipe.

5 Claims, 6 Drawing Figures

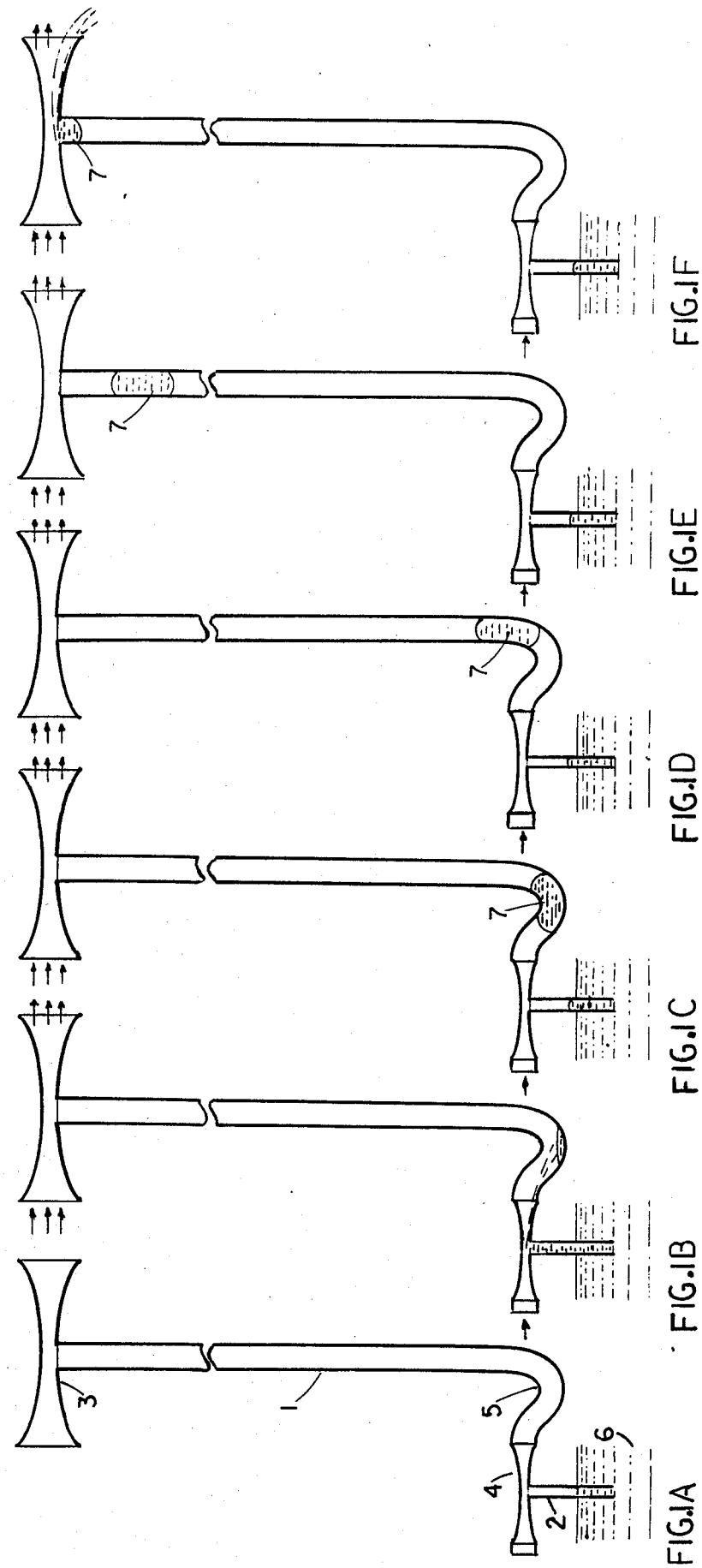

APPARATUS FOR ELEVATING LIQUIDS INCLUDING A PAIR OF VENTURI PIPES HAVING WIND AS MOTIVE FLUID

BACKGROUND OF THE INVENTION

The present invention relates to an arrangement for elevating liquids with the aid of wind energy.

Arrangements for elevating liquids are known in the art. Some known arrangements use pumps with movable parts or are based on aspirating action of liquid jet, for example, steam-jet pumps which are used for supplying water to steam boilers using the energy of discharge steam jet. U.S. Pat. No. 1,154,745 discloses an arrangement for elevating liquids with the use of wind energy for elevating the liquid to a height which is higher than the height of a solid liquid column whose pressure is equal to the pressure difference under action of which the liquid is being elevated. This object is achieved in that the liquid to be elevated forms in the pipe not an uninterrupted column, but instead is composed of a plurality of piston-like liquid portions separated from one another by air bubbles or plugs.

The above described arrangement possesses, however, some disadvantages. For regulating of the speed of liquid supply from a resrvoir into a delivery (discharge) pipe as a strictly increasing function of the value of pressure differential in the pipe (or wind speed), the arrangement includes a centrifugal regulator turnable by wind, and a controllable valve which is electrically connected with the centrifugal regulator and has a variable cross sectional area. With the aid of these parts, the area of through cross section of the valve increases, and therefore the speed of delivery of the liquid into the delivery pipe increases with the increase of wind speed, and vice versa. However, the arrangement, has a relatively high cost, low reliability, insufficiently long service life, and is complicated to maintain. It is therefore desirable to develop such arrangements for elevating liquids which have improved characteristis as compared with the above described arrangement.

SUMMARY OF THE INVENTION

Accordingly, it is an object of the present invention to provide an arrangement for elevating liquids, which avoids the disadvantages of the prior art.

More particularly, it is an object of the present invention to provide an arrangement for elevating liquids, which is less expensive, more reliable, has a long service life and is substantially maintenance-free, while using the energy of wind.

In keeping with these objects and with others which will become apparent hereinafter, one feature of the present invention resides, briefly stated, in an arrangement for elevating liquids, which has a delivery pipe connected by its upper end with a pumping-out means, a supply pipe introducable into liquid and having an upper end connected with a contriction of a Venturi pipe, and a downwardly convex connecting pipe which connects the outer diffuser of the Venturi pipe with the lower end of the delivery pipe, while the inlet diffuser of the Venturi pipe is open.

The supply pipe and the delivery pipe are substantially vertical and offset, while the Venturi pipe is substantially horizontal. The downwardly convex connecting pipe can be made of one piece with the delivery pipe.

The pumping-out means can be formed as a further Venturi pipe with a constriction connected with the upper end of the delivery pipe, and an inlet diffuser which is open for receiving of wind.

The thus designed arrangement for elevating liquids eliminates the disadvantages of the prior art and attains the above listed objects.

The novel features of the present invention are set forth in particular in the appended claims. The invention itself, however, will be best understood from the following description of a preferred embodiment which is accompanied by the following drawings.

BRIEF DESCRIPTION OF THE DRAWING

The single FIGURE of the drawing shows views of the inventive arrangement for elevating liquid with the aid of wind, in different phases of its operation of elevating a liquid from a reservoir at a predetermined height.

DESCRIPTION OF A PREFERRED EMBODIMENT

Arrangement for elevating liquids with the aid of air in accordance with the present invention includes a delivery (discharge) pipe 1 and a liquid supply pipe 2. The pipes 1 and 2 are substantially vertical and have axes which are offset from one another in a horizontal direction. The axes of the pipes 1 and 2 do not have to be strictly vertical, it is sufficient if they are located in substantially vertical planes.

The upper end of the delivery pipe 1 is connected with a pumping-out means for forming rarification in the delivery pipe 1. The pumping-out means can be formed for example, as an upper Venturi pipe 3. It has an inlet diffuser for receiving wind, an outlet diffuser, and a contriction connected with the upper end of the delivery pipe 1. The upper Venturi pipe has a substantially horizontal axis.

The liquid supply pipe 2 is located lower than the delivery pipe 1. The liquid supply pipe 2 has a lower end to be inserted into a liquid and an upper end connected with a lower Venturi pipe 4. The lower Venturi pipe has an inlet diffuser, a constriction connected with the upper end of the liquid supply pipe 2, and an outlet diffuser.

The outlet diffuser of the lower Venturi pipe 4 is connected with a lower end of the delivery pipe 1 through a downwardly convex pipe 5, so that the lower end of the delivery pipe 1 is located lower than the lower Venturi pipe 4. The pumping-out means can be formed not as a Venturi pipe, but instead as other conventional pumping-out elements.

The arrangement for elevating liquids with the aid wind operates in the following manner.

When rarification is produced in the delivery pipe 1, for example, under the action of air jet passing through the upper Venturi pipe 3 as a result of wind, air aspirated from the lower Venturi pipe 4 produces in the constriction of the latter rarification. As a result of this rarification, liquid from the reservoir 6 is elevated into and through the supply pipe 2 and supplied into the convex pipe 5, as shown in view B. When the cross section of the convex pipe 5 has been closed by the liquid as shown in view C, the speed of air jet through the lower Venturi pipe 4 and the delivery pipe 1 decreases, the level of liquid in the supply pipe 2 lowers, and the liquid stops flowing into the convex pipe 5, so that a formed liquid portion 7 remains in the convex pipe.

Under the action of the pumping-out force, the liquid portion 7 then moves upwardly in the delivery pipe 1 as shown in views D and E. After reaching the upper end of the delivery pipe 1, the liquid portion flows out through the outlet diffuser of the upper Venturi pipe 3 out of the arrangement.

Up to a predetermined speed, wind or another energy source produces a first threshold of pumping out force in the delivery pipe 1, whereby one liquid portion is present in the delivery pipe. A change of the aspirating force between the first treshold value which is sufficient for aspirating the elevated liquid into the convex pipe 5 and displacing the formed liquid portion upwardly through the delivery pipe 1, and the second threshold value, will result in corresponding change of the speed of elevation of individual liquid portions. If the aspirating force is higher than the second threshold value, then the speed of elevation of a formed liquid portion and therefore the speed of air jet through the lower Venturi pipe 4 is sufficient for aspiration of a new liquid portion into the convex pipe 5 and the delivery pipe 1. Therefore, simultaneously two liquid portions can be elevated through the delivery pipe 1. Increase of the aspirating force in the delivery pipe will lead to increase of the speed of elevation of two liquid portions to a third threshold of the aspirating force. After exceeding the aspirating force of the third threshold, simultaneously three liquid portions will move through the delivery pipe, and so on. Thus, the liquid is elevated without any movable parts.

The invention is not limited to the details shown since various modofications and structural changes are possible without departing in any way from the spirit of the present invention.

What is desired to be protected by Letters Patent is set forth in particular in the appended claims.

I claim:

1. An arrangement for elevating liquids, comprising a substantially vertical delivery pipe having a lower end and an upper end;
a first Venturi pipe extending substantially horizontally and having an inlet diffuser for receiving wind, and a constriction connected with said upper end of said delivery pipe, and an outlet diffuser;
a substantially vertical liquid supply pipe located lower than said delivery pipe and having a lower end to be introduced into a liquid, and an upper end;
a second Venturi pipe extending substantially horizontally and having an inlet diffuser open to atmosphere, a constriction connected with said upper end of said supply pipe, and an outlet diffuser; and
a connecting pipe which connects said outlet diffuser of said second Venturi pipe with said lower end of said delivery pipe so that said lower end of said delivery pipe is located lower than said outlet diffuser of said second Venturi pipe whereby a composite column of portions of liquid and air exists in the delivery pipe during operation of said arrangement.

2. An arrangement as defined in claim 1, wherein said delivery pipe and said supply pipe are substantially offset from one another in a horizontal direction.

3. An arrangement as defined in claim 1, wherein said connecting pipe and said delivery pipe together form a one piece pipe member.

4. An arrangement as defined in claim 1, wherein said connecting pipe is formed as a downwardly convex pipe.

5. An arrangement as defined in claim 1, wherein all said pipes are formed one-piece with one another so that said arrangement is formed as a whole as a one-piece member.

* * * * *